United States Patent
Cadix et al.

(10) Patent No.: US 10,457,862 B2
(45) Date of Patent: Oct. 29, 2019

(54) HYDRATION OF ASSOCIATIVE POLYMERS

(71) Applicant: RHODIA OPERATIONS, Paris (FR)

(72) Inventors: Arnaud Cadix, Saint-Ouen (FR); David James Wilson, Coye la Forêt (FR)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 15/507,903

(22) PCT Filed: Sep. 7, 2015

(86) PCT No.: PCT/EP2015/070396
§ 371 (c)(1),
(2) Date: Mar. 1, 2017

(87) PCT Pub. No.: WO2016/034743
PCT Pub. Date: Mar. 10, 2016

(65) Prior Publication Data
US 2017/0298269 A1    Oct. 19, 2017

(30) Foreign Application Priority Data

Sep. 5, 2014  (FR) .................................. 14 01999

(51) Int. Cl.
| | | |
|---|---|---|
| C09K 8/68 | (2006.01) |
| C09K 8/88 | (2006.01) |
| C08J 3/05 | (2006.01) |
| C08J 3/075 | (2006.01) |
| C09K 8/035 | (2006.01) |
| C09K 8/584 | (2006.01) |
| C09K 8/588 | (2006.01) |
| C09K 8/60 | (2006.01) |
| C09D 133/26 | (2006.01) |
| C08F 220/56 | (2006.01) |
| C09K 8/12 | (2006.01) |
| C08L 33/02 | (2006.01) |
| C08L 33/26 | (2006.01) |
| E21B 43/26 | (2006.01) |

(52) U.S. Cl.
CPC ............ *C09K 8/882* (2013.01); *C08F 220/56* (2013.01); *C08J 3/05* (2013.01); *C08J 3/075* (2013.01); *C09D 133/26* (2013.01); *C09K 8/035* (2013.01); *C09K 8/12* (2013.01); *C09K 8/584* (2013.01); *C09K 8/588* (2013.01); *C09K 8/602* (2013.01); *C09K 8/68* (2013.01); *C09K 8/88* (2013.01); *C08J 2333/02* (2013.01); *C08J 2333/26* (2013.01); *C08L 33/02* (2013.01); *C08L 33/26* (2013.01); *E21B 43/26* (2013.01)

(58) Field of Classification Search
CPC ...... E21B 43/26; E21B 43/267; E21B 21/062; E21B 7/00; C09K 8/685; C09K 8/887; C09K 2208/26; C09K 8/62; C09K 8/72; C09K 8/74; C09K 8/882; C09K 17/16; C09K 21/10; C09K 21/14; C09K 2208/12; C09K 3/00; C09K 8/035; C09K 8/08; C09K 8/12; C09K 8/26; C09K 8/28; C09K 8/46; C09K 8/516; C09K 8/518; C09K 8/68; C09K 8/92; C09K 8/94

See application file for complete search history.

(56) References Cited

U.S. PATENT DOCUMENTS 4,814,096 A * 3/1989 Evani ................. C08L 33/26
166/270.1
2014/0378617 A1    12/2014 Wilson et al.

FOREIGN PATENT DOCUMENTS

WO    2013060741 A1    5/2013
WO    WO2013/060741    *    5/2013

OTHER PUBLICATIONS https://en.wikipedia.org/wiki/Ether downloaded on Sep. 5, 2018.*
VISWAAT product data sheet downloaded on Sep. 5, 2018.*
Kumar Sanjeev et al.: "Salt-Induced Cloud Point in Anionic Surfactant Solutions: Role of the Headgroup and Additives", Langmuir, vol. 18, No. 11, May 1, 2002, pp. 4205-4209.

* cited by examiner

*Primary Examiner* — Kumar R Bhushan

(57) ABSTRACT

The present invention relates to a method which allows quick and effective hydration of associative polymers, in particular those intended for use in the field of oil drilling. This method uses a specific solid formulation, which can be easily hydrated, including, in a pre-mixture, said associative polymers and surfactants capable of improving the hydration of these polymers.

14 Claims, No Drawings

HYDRATION OF ASSOCIATIVE POLYMERS

This application is a U.S. national phase entry under 35 U.S.C. § 371 of International Application No. PCT/EP2015/070396, filed on Sep. 7, 2015, which claims priority to French Application No. 1401999, filed on Sep. 5, 2014. The entire contents of these applications are incorporated herein by this reference.

The present invention relates to the field of "associative" polymers which are used, in particular in the field of oil extraction, to modify the rheology of aqueous liquid media, in particular in order to increase the viscosity thereof, or even to gel them. More specifically, the invention relates to the hydration of associative polymers of this type.

Associative polymers, which are well known from the prior art, are generally amphiphilic polymers bearing hydrophobic groups (typically pendant hydrophobic chains bonded to a hydrophilic backbone), and which self-associate with an aqueous medium via phenomena of phase microseparation of these hydrophobic groups.

When seeking to hydrate such polymers, namely to disperse them in an aqueous medium (in the form of a more or less viscous solution or of a gel, depending on the polymer concentration), it is well known that the hydration is not immediate. It generally involves significant stirring, or even an increase in temperature, and even under these conditions, it often requires a few hours.

The problem of hydration becomes quite particularly complicated for polymers which have a marked hydrophobic nature, as is the case in particular with polymers intended to be used at high temperature in oil-bearing formations.

The hydration of associative polymers in an aqueous medium is, in addition, even more difficult when the aqueous medium in which it is desired to dissolve or disperse the polymers is a saline medium. Thus, for example, the hydration of the associative polymers used in oil extraction often proves to be very lengthy and difficult when a brine, for example sea water, is used to hydrate the polymers.

In order to improve the kinetics of the hydration, it has been proposed to perform it in the presence of surfactants capable of modifying the hydrophobic interactions between the chains. In theory, surfactants bearing hydrophilic and hydrophobic groups used in sufficient amount are likely to "screen" the amphiphilic groups of the associative polymers and therefore to reduce their hydrophobic nature, which must result in easier hydration. However, in practice, the addition of surfactants does not always have the expected effect, and, in the publications which mention the use of surfactants, the hydration of polymers generally remains described as a lengthy operation, typically carried out at least overnight (by way of illustration, reference may be made, inter alia, to the examples of U.S. Pat. No. 4,814,096).

One objective of the present invention is to provide an effective method for hydration of associative polymers of the abovementioned type, which allows the hydration of the polymers in a reduced time, this being including using polymers with a strong hydrophobic nature and/or in the presence of salts.

To this effect, the present invention proposes using surfactants of the type envisioned in the prior art, but under specific conditions which optimize their effect on the hydration kinetics, namely by bringing the polymers and surfactants into intimate contact beforehand.

More specifically, according to a first aspect, a subject of the present invention is a process for hydration of associative polymers (P), resulting in the preparation of an aqueous composition comprising said polymers (P) in the form of a solution or of a gel, comprising a step (E) of adding water to a solid composition (C), comprising:
 said associative polymers (P); and
 surfactants (S) suitable for improving the hydration of these polymers,
 wherein said solid composition (C) is as obtained by drying an aqueous composition comprising a mixture of the associative polymers (P) in the hydrated state and of the surfactants (S).

The solid composition (C) used in the context of the present invention is a composition "as obtained" or "capable of being obtained" by drying an aqueous composition comprising a mixture of the associative polymers (P) and of the surfactants (S) in the hydrated state, which means that it has all the characteristics of a composition obtained according to such drying, but does not necessarily imply that it is actually obtained by drying an aqueous composition comprising a mixture of the associative polymers (P) and of the surfactants (S) in the hydrated state. On the contrary, the solid composition (C) can be obtained according to any other means, some of which are explained in greater detail hereinafter.

As is illustrated by the examples at the end of the present description, the work that was carried out by the inventors in the context of the present application has now made it possible to demonstrate that the use of the surfactant in the form of the abovementioned composition (C), wherein it is schematically "in a pre-mixture" with the polymers (P), results in optimization of the hydration, with in particular an extremely reduced hydration time compared with other surfactant introduction modes. This optimization of the hydration makes it possible in particular to perform the hydration in a period of time that is shorter than that which is required when not carrying out the pre-mixing. Typically, the hydration of step (E) is carried out under these conditions.

According to one preferential embodiment, the hydration of step (E) is carried out in less than five hours, or even less than three hours, typically in less than one hour.

Whatever the exact mode of preparation of the composition (C), this composition preferentially comprises the associative polymers (P) and the surfactants (S) in a state wherein the hydrophobic groups of the polymers are undergoing interaction with surfactants on the scale of phase microseparations, as a result of which the effect of the polymers is optimized during step (E).

The composition (C) which is used in the context of the present invention is a particular formulation of the associative polymers (P) and the surfactants (S) which proves to be very easy to hydrate. Formulations of this type have been incidentally described in the past (for example in U.S. Pat. No. 4,814,096, wherein the synthesis of associative polymers is carried out in the presence of surfactants and then dried), but the rehydration capacities of this type of composition have never been mentioned. On the contrary, in the documents wherein this type of composition is described, the hydration is carried out conventionally: in the examples of U.S. Pat. No. 4,814,096, it is indicated that the hydration is carried out overnight, and the accelerated hydration effect was not therefore identified in said document.

Step (E) of the process which is the subject of the present invention can therefore also be described as a use of the composition (C) for improving the hydration of the associative polymers that it contains. A subject of the invention is in particular the use of the compositions (C) for forming a solution or a gel of the polymers (P) in an aqueous fluid used in the oil sector.

According to another particular aspect, a subject of the present invention is certain compositions (C) of the abovementioned type which, to the inventors' knowledge, have never been described to date.

In this context, a subject of the invention is in particular compositions which cannot be obtained according to the process described in the abovementioned U.S. Pat. No. 4,814,096, and in particular the compositions (C) of the abovementioned type, of the type obtained by post-addition of the surfactants (S) to polymers (P) resulting from a micellar polymerization of the type described later in the present description.

A subject of the present invention is in particular the compositions (C) wherein the polymers have a weight-average molar mass (Mw) greater than 500000 g/mol, preferably greater than 1000000 g/mol, in particular between 2000000 and 10000000 g/mol (for example between 3000000 and 5000000 g/mol).

In step (E) of the process of the invention, the solid composition (C) is brought into contact with water (typically by introducing the composition into the water or by pouring water onto the composition). This is intended to mean that the polymer is brought into contact with water or with a composition comprising water and suitable for hydrating the polymer, for example an aqueous solution comprising salts, and in particular a brine, for example seawater or else water from hydrocarbon production wells.

According to one embodiment, the water is added in step (E) in the form of a saline solution or of a brine having an ionic strength of between 0.3 and 15 mol/l. The process of the invention allows effective hydration of the polymers (P), including under these conditions, and this being even for high ionic strength ranges, for example greater than 1 mol/l, or even greater than 2 mol/l or greater than 5 mol/l.

The particularly effective hydration process of the present invention can be used in various fields, wherein the associative polymers can be rapidly hydrated using the composition (C).

By way of example, the process of the invention can be used to form aqueous solutions or gels intended for oil extraction, for example:
 for preparing fracturing and/or stimulation fluids,
 for producing completion fluids,
 for producing drilling fluids,
 for carrying out enhanced oil recovery (EOR), in particular according to techniques referred to as "polymer flooding".

Various aspects and embodiments of the invention will now be described in greater detail.

THE ASSOCIATIVE POLYMERS (P)

They are amphiphilic polymers suitable for gelling water (and, in practice, an aqueous medium) and which generally comprise a hydrophilic backbone and hydrophobic groups bonded to this backbone (typically hydrophobic units bearing pendant hydrophobic groups, generally present in a proportion of 0.1 to 5 mol % relative to the total monomer units present in the polymer).

The hydrophobic groups present in the polymers (P) can be specifically distributed at the ends of the backbone, or else more or less randomly along the hydrophilic chain.

According to one advantageous mode, the hydrophobic groups present in the polymers (P) are concentrated in microblocks (typically, the polymers (P) then have a backbone consisting of a sequence of hydrophilic units, interrupted by blocks of a few consecutive hydrophobic units (typically of about 2 to 40, for example between 3 and 30)). Polymers (P) suitable for this purpose can for example be obtained by micellar polymerization, in particular according to the process described in application WO 2013/060741.

The term "micellar polymerization" or "micellar radical polymerization" is intended to mean herein a synthesis of block polymers of multiblock type by copolymerization of hydrophilic monomers and hydrophobic monomers in an aqueous dispersant medium (typically water or a water/alcohol mixture), which comprises:
 the hydrophilic monomers in the state dissolved or dispersed in said medium; and
 the hydrophobic monomers in micelles of surfactant, formed in said medium by introducing this surfactant therein at a concentration greater than its critical micelle concentration (cmc).

According to one particular mode, the hydrophobic monomers present in micelles of surfactants used in micellar polymerization may be monomers which, in themselves, have the property of forming micelles without the need to add additional surfactants (monomers referred to as "self-micellizable" in the remainder of the description). According to this particular mode, the surfactant used may be the self-micellizable hydrophobic monomer itself, used without another surfactant, although the presence of an additional surfactant is not excluded. Thus, for the purposes of the present description, when mention is made of hydrophobic monomers in micelles of surfactants, this notion encompasses both (i) hydrophobic monomers present in micelles of surfactant other than these monomers and (ii) monomers comprising at least one hydrophobic part or block and forming by themselves the micelles in aqueous medium. The abovementioned two modes (i) and (ii) are compatible and can coexist (hydrophobic monomers in micelles formed by another self-micellizable monomer for example, or else micelles comprising a combination of surfactants and of self-micellizable monomers).

In micellar polymerization, the hydrophobic monomers contained in the micelles are referred to as in "micellar solution". The micellar solution to which reference is made is a microheterogeneous system which is generally isotropic, optically transparent and thermodynamically stable.

It should be noted that a micellar solution of the type of that used in micellar polymerization is to be distinguished from a microemulsion. In particular, contrary to a microemulsion, a micellar solution forms at any concentration exceeding the critical micelle concentration of the surfactant used, with the only condition being that the hydrophobic monomer is soluble at least to a certain extent in the internal space of the micelles. A micellar solution differs, moreover, from an emulsion by virtue of the absence of an internal homogeneous phase: the micelles contain a very low number of molecules (typically less than 1000, generally less than 500 and typically from 1 to 100, with most commonly 1 to 50 monomers and at most a few hundred surfactant molecules when a surfactant is present) and the micellar solution generally has physical properties similar to those of the micelles of surfactant without monomers. Moreover, a micellar solution is usually transparent with respect to visible light, given the small size of the micelles which does not result in refraction phenomena, contrary to the drops of an emulsion, which refract light and give it its characteristic white or hazy appearance.

The micellar polymerization technique results in characteristic block polymers which each contain several hydrophobic blocks approximately of the same size and wherein this size can be controlled. Indeed, given the confining of the hydrophobic monomers in the micelles, each of the hydrophobic blocks formed is of controlled size and contains approximately a defined number $n_H$ of hydrophobic monomers, it being possible for this number $n_H$ to be calculated as follows (Macromolecular Chem. Physics, 202, 8, 1384-1397, 2001):

$$n_H = N_{agg} \cdot [M_H]/([\text{surfactant}]-\text{cmc})$$

wherein:
$N_{agg}$ is the aggregation number of the surfactant, which reflects the number of surfactant present in each micelle,
$[M_H]$ is the molar concentration of hydrophobic monomer in the medium and [surfactant] is the molar concentration of surfactant in the medium, cmc is the critical micelle (molar) concentration.

The micellar polymerization technique thus allows an advantageous control of the hydrophobic units introduced into the polymers formed, namely:
an overall control of the molar fraction of hydrophobic units in the polymer (by modulating the ratio of the concentrations of the two monomers); and
a more specific control of the number of hydrophobic units present in each of the hydrophobic blocks (by modifying the parameters influencing the $n_H$ defined above).

Preferably, the polymers (P) are synthesized according to a controlled micellar radical polymerization step in which the following are brought into contact, in an aqueous medium (M):
hydrophilic monomers, dissolved or dispersed in said aqueous medium (M);
hydrophobic monomers in the form of a micellar solution, namely containing, in the state dispersed in the medium (M), micelles of surfactants (preferably distinct from the surfactants (S), although it can be envisioned according to certain modes of using the surfactants (S) for performing this micellar polymerization) comprising these hydrophobic monomers (it being possible in particular for this dispersed state to be obtained using at least one surfactant);
at least one radical polymerization initiator, this initiator being typically water-soluble or water-dispersible; and
at least one radical polymerization control agent.

The term "radical polymerization control agent" is intended to mean herein a compound capable of extending the lifetime of the growing polymer chains in a polymerization reaction and of conferring on the polymerization a living or controlled nature. This control agent is typically a reversible transfer agent as used in the controlled radical polymerizations denoted under the terminology RAFT or MADIX, which typically implement a process of reversible transfer by addition-fragmentation, such as those described for example in WO96/30421, WO 98/01478, WO 99/35178, WO 98/58974, WO 00/75207, WO 01/42312, WO 99/35177, WO 99/31144, FR2794464 or WO 02/26836.

According to one advantageous embodiment, the radical polymerization control agent used in step (E) is a compound which comprises a thiocarbonylthio —S(C=S)— group. Thus, for example, it may be a compound which comprises a xanthate group (bearing —SC=S—O— functions), for example a xanthate. Other types of control agent can be envisioned (for example of the type of those used in CRP or in ATRP).

According to one particular mode, the control agent used in step (E) may be a polymer chain resulting from a controlled radical polymerization and bearing a group suitable for controlling a radical polymerization (polymer chain said to be of "living" type, of type well known per se). Thus, for example, the control agent may be a polymer chain (preferably hydrophilic or water-dispersible) functionalized at the chain end with one of one with a xanthate group or more generally a group comprising an —SC=S— group, for example obtained according to the MADIX technology.

Alternatively, the control agent used in step (E) is a non-polymer compound bearing a group which provides control of the radical polymerization, in particular a thiocarbonylthio —S(C=S)— group.

The control agent may for example correspond to formula (A) below:

(A)

in which:
Z represents:
a hydrogen atom,
a chlorine atom,
an optionally substituted alkyl or optionally substituted aryl radical,
an optionally substituted heterocycle,
an optionally substituted alkylthio radical,
an optionally substituted arylthio radical,
an optionally substituted alkoxy radical,
an optionally substituted aryloxy radical,
an optionally substituted amino radical,
an optionally substituted hydrazine radical,
an optionally substituted alkoxycarbonyl radical,
an optionally substituted aryloxycarbonyl radical,
a carboxy radical or an acyloxy radical which is optionally substituted,
an optionally substituted aroyloxy radical,
an optionally substituted carbamoyl radical,
a cyano radical,
a dialkyl- or diarylphosphonato radical,
a dialkylphosphinato or diarylphosphinato radical, or
a polymer chain,
and
$R_1$ represents:
an optionally substituted alkyl, acyl, aryl, aralkyl, alkene or alkyne group,
a carbon-based ring or a heterocycle, which is saturated or unsaturated, aromatic and optionally substituted, or
a polymer chain, which is preferably hydrophilic or water-dispersible when the agent is used in step (E).

The $R_1$ or Z groups, when they are substituted, may be substituted with optionally substituted phenyl groups, optionally substituted aromatic groups, saturated or unsaturated carbon-based rings, saturated or unsaturated heterocycles, or alkoxycarbonyl or aryloxycarbonyl (—COOR), carboxy —(COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, perfluoroalkyl $C_nF_{2n+1}$, allyl, epoxy, alkoxy (—OR), S-alkyl or S-aryl groups, groups which have a hydrophilic or ionic nature, such as carboxylic acid alkaline salts, sulfonic acid alkaline salts, polyalkylene oxide (PEO, POP) chains, cationic substituents (quaternary ammonium salts), R representing an alkyl or aryl group, or a polymer chain.

According to one advantageous mode, whatever their exact mode of preparation, the polymers (P) have a high molar mass, typically a weight-average molar mass Mw of at least 500000 g/mol, for example greater than or equal to 1000000 g/mol, in particular greater than 2000000 g/mol, with theoretical weight-average molar masses generally remaining less than 10000000 g/mol (reference is made here to the theoretical molar mass because the actual measurement is generally difficult to measure for polymers of very high mass), typically between 3000000 and 5000000 g/mol.

Advantageous polymers (P) according to the invention include hydrophobic microblocks of 2 to 40, for example, 3 to 30, consecutive theoretical units with aliphatic (alkyl in particular) or aromatic carbon-based chains, typically comprising from 6 to 30 carbon atoms, for example between 8 and 22 carbon atoms, in particular between 10 and 18 carbon atoms.

By way of illustration, the associative polymers (P) may comprise:
  by way of hydrophilic monomer units (typically constituting the polymer "backbone"), monomer units selected from:
    ethylenically unsaturated carboxylic acids, sulfonic acids and phosphonic acids, and/or derivatives thereof such as acrylic acid (AA), methacrylic acid, ethacrylic acid, α-chloroacrylic acid, crotonic acid, maleic acid, maleic anhydride, itaconic acid, citraconic acid, mesaconic acid, glutaconic acid, aconitic acid, fumaric acid, monoesters of monoethylenically unsaturated dicarboxylic acids comprising 1 to 3, preferably 1 to 2, carbon atoms, for example monomethyl maleate, vinylsulfonic acid, (meth)allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, 2-acrylamido-2-methylpropanesulfonic acid, vinylphosphonic acid, α-methylvinylphosphonic acid and allylphosphonic acid;
    esters of α,β-ethylenically unsaturated mono- and dicarboxylic acids with $C_2$-$C_3$-alkanediols, for example 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate and polyalkylene glycol (meth) acrylates;
    amides of α,β-ethylenically unsaturated monocarboxylic acids and N-alkyl and N,N-dialkyl derivatives thereof, such as acrylamide, methacrylamide, N-methyl(meth)acrylamide, N-ethyl(meth)acrylamide, N-propyl(meth)acrylamide, N,N-dimethyl (meth)acrylamide, N,N-diethyl(meth)acrylamide, morpholinyl(meth)acrylamide and metholylacrylamide (acrylamide and N,N-dimethyl(meth)acrylamide proved to be in particular advantageous);
    N-vinylactams and derivatives thereof, for example N-vinylpyrrolidone and N-vinylpiperidone;
    open-chain N-vinylamide compounds, for example N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide and N-vinylbutyramide;
    esters of α,β-ethylenically unsaturated mono- and dicarboxylic acids with amino alcohols, for example N,N-dimethylaminomethyl (meth) acrylate, N,N-dimethylaminoethyl (meth) acrylate, N,N-diethylaminoethyl acrylate, and N,N-dimethylaminopropyl (meth) acrylate;
    amides of α,β-ethylenically unsaturated mono- and dicarboxylic acids with diamines comprising at least one primary or secondary amino group, such as N-[2-(dimethylamino) ethyl] acrylamide, N-[2-(dimethylamino) ethyl]methacrylamide, N-[3-(dimethylamino)propyl]acrylamide, N-[3-(dimethylamino) propyl]methacrylamide, N-[4-(dimethylamino) butyl]acrylamide and N-[4-(dimethylamino)butyl] methacrylamide;
    N-diallylamines, N,N-diallyl-N-alkylamines, acid addition salts thereof and quaternization products thereof, the alkyl used here being preferentially $C_1$-$C_3$-alkyl;
    N,N-diallyl-N-methylamine and N,N-diallyl-N, N-dimethylammonium compounds, for example the chlorides and bromides;
    vinyl- and allyl-substituted nitrogenous heterocycles, for example N-vinylimidazole, N-vinyl-2-methylimidazole, vinyl- and allyl-substituted heteroaromatic compounds, for example 2- and 4-vinylpyridine, 2- and 4-allylpyridine, and salts thereof;
    sulfobetains; and
    mixtures and combinations of two or more of the abovementioned monomers.

According to one particular embodiment, the hydrophilic monomer units present in the polymers (P) comprise acrylic acid (AA). According to one possible embodiment, the monomer units are all acrylic acids, but it is also possible to envision to use, by way of monomers, a mixture comprising, inter alia, acrylic acid, as a mixture with other hydrophilic monomers.

According to one preferential embodiment, the hydrophilic monomer units present in the polymers (P) comprise (meth)acrylic acid and/or (meth)acrylamido monomers.

According to another particular embodiment, the monomers used in the process of the invention are in particular acrylic acid, methacrylic acid, and/or salts thereof, and/or mixtures thereof.

For the purpose of the present description, the term "(meth)acrylic acid" encompasses methacrylic acid, acrylic acid and mixtures thereof. Likewise, for the purposes of the present description, the term "(meth)acrylate" encompasses methacrylate, acrylate and mixtures thereof. Likewise, for the purposes of the present description, the term "(meth) acrylamide/(meth)acrylamido" encompasses methacrylamide/methacrylamido, acrylamide/acrylamido and mixtures thereof.

According to another embodiment, the monomers used in step (E) comprise (and typically consist of) (meth)acrylamide monomers, or more generally (meth)acrylamido monomers, including:
  acrylamido monomers, namely acrylamide, the sulfonate derivative thereof (AMPS), quaternary ammonium (APTAC) and sulfopropyldimethylammoniumpropylacrylamide;
  methacrylamido monomers, such as sulfopropyldimethylammoniumpropylmethacrylamide (SPP) or sulfohydroxypropyldimethylammoniumpropylmethacrylamido.
by way of hydrophobic monomer units (advantageously grouped together in hydrophobic microblocks typically comprising from 2 to 40 consecutive units interrupting the "hydrophilic backbone" of the polymer), monomer units selected from:

vinylaromatic monomers, such as styrene, alpha-methylstyrene, para-chloromethylstyrene, vinyltoluene, 2-methylstyrene, 4-methylstyrene, t-butyl styrene, 2-(n-butyl)styrene or 4-(n-decyl)styrene;

halogenated vinyl compounds, such as vinyl halides or vinylidene halides, for instance vinyl chlorides or fluorides or vinylidene chlorides or fluorides, corresponding to the formula $R_bR_cC=CX^1X^2$, wherein:
$X_1$=F or Cl
$X^2$=H, F or Cl
each of $R_b$ and $R_c$ represents, independently:
H, Cl, F; or
an alkyl group, which is preferably chlorinated and/or fluorinated, more advantageously perchlorinated or perfluorinated;

esters of α,β-ethylenically unsaturated mono- and dicarboxylic acids with $C_2$-$C_{30}$-alcanols, for example methyl ethacrylate, ethyl (meth)acrylate, ethyl ethacrylate, n-propyl (meth)acrylate, isopropyl (meth)acrylate, n-butyl (meth)acrylate, sec-butyl (meth) acrylate, tert-butyl (meth)acrylate, tert-butyl ethacrylate, n-hexyl (meth)acrylate, n-heptyl (meth)acrylate, n-octyl (meth)acrylate, 1,1,3,3-tetramethylbutyl (meth)acrylate, ethylhexyl (meth)acrylate, n-nonyl (meth)acrylate, n-decyl (meth)acrylate, n-undecyl (meth)acrylate, tridecyl (meth)acrylate, myristyl (meth) acrylate, pentadecyl (meth) acrylate, palmityl (meth)acrylate, heptadecyl (meth) acrylate, nonadecyl (meth) acrylate, arachidyl (meth)acrylate, behenyl (meth)acrylate, lignoceryl (meth) acrylate, cerotinyl (meth) acrylate, melissinyl (meth) acrylate, palmitoleoyl (meth)acrylate, oleyl (meth)acrylate, linolyl (meth)acrylate, linolenyl (meth) acrylate, stearyl (meth)acrylate, lauryl (meth)acrylate and mixtures thereof;

esters of vinyl or allyl alcohol with $C_1$-$C_{30}$ monocarboxylic acids, for example vinyl formate, vinyl acetate, vinyl propionate, vinyl butyrate, vinyl laurate, vinyl stearate, vinyl propionate, vinyl versatate and mixtures thereof;

ethylenically unsaturated nitriles, such as acrylonitrile, methacrylonitrile and mixtures thereof;

esters of α,β-ethylenically unsaturated mono- and dicarboxylic acids with $C_3$-$C_{30}$ alkanediols, for example 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate and 3-hydroxy-2-ethylhexyl methacrylate;

primary amides of α,β-ethylenically unsaturated mono- and dicarboxylic acids and the N-alkyl and N,N-dialkyl derivatives, such as N-propyl(meth)acrylamide, N-(n-butyl) (meth)acrylamide, N-(tert-butyl) (meth)acrylamide, N-(n-octyl) (meth)acrylamide, N-(1,1,3,3-tetramethylbutyl) (meth)acrylamide, N-ethylhexyl(meth) acrylamide, N-(n-nonyl) (meth)acrylamide, N-(n-decyl) (meth)acrylamide, N-(n-undecyl) (meth) acrylamide, N-tridecyl(meth)acrylamide, N-myristyl (meth)acrylamide, N-pentadecyl(meth)acrylamide, N-palmityl(meth)acrylamide, N-heptadecyl(meth) acrylamide, N-nonadecyl(meth)acrylamide, N-arachidyl(meth)acrylamide, N-behenyl(meth)acrylamide, N-lignoceryl(meth)acrylamide, N-cerotinyl (meth)acrylamide, N-melissinyl(meth)acrylamide, N-palmitoleoyl(meth)acrylamide, N-oleyl(meth)acrylamide, N-linolyl(meth)acrylamide, N-linolenyl(meth) acrylamide, N-stearyl(meth)acrylamide and N-lauryl (meth)acrylamide;

N-vinyllactams and derivatives thereof, such as N-vinyl-5-ethyl-2-pyrrolidone, N-vinyl-6-methyl-2-piperidone, N-vinyl-6-ethyl-2-piperidone, N-vinyl-7-methyl-2-caprolactam and N-vinyl-7-ethyl-2-caprolactam;

esters of α,β-ethylenically unsaturated mono- and dicarboxylic acids with amino alcohols, for example N,N-dimethylaminocyclohexyl (meth) acrylate;

amides of α,β-ethylenically unsaturated mono- and dicarboxylic acids with diamines comprising at least one primary or secondary amino group, for example N-[4-(dimethylamino)butyl]acrylamide, N-[4-(dimethylamino)butyl]methacrylamide, N-[2-(diethylamino) ethyl]acrylamide, N-[4-(dimethylamino)cyclohexyl] acrylamide and N-[4-dimethylamino]cyclohexyl] methacrylamide; and $C_2$-$C_8$ monoolefins and nonaromatic hydrocarbons comprising at least two conjugated double bonds, for example ethylene, propylene, isobutylene, isoprene and butadiene.

According to one preferential embodiment, the hydrophobic monomers may be selected from:

$C_1$-$C_{30}$ alkyl, preferably $C_4$-$C_{22}$ alkyl, α,β-unsaturated esters, in particular alkyl acrylates and methacrylates, such as methyl, ethyl, butyl, 2-ethylhexyl, isooctyl, lauryl, isodecyl or stearyl acrylates and methacrylates (lauryl methacrylate in particular proves to be especially advantageous);

$C_1$-$C_{30}$ alkyl and preferably $C_4$-$C_{22}$ alkyl α,β-unsaturated amides, in particular alkylacrylamides and alkylmethacrylamides, such as methyl-, ethyl-, butyl, 2-ethylhexyl-, isooctyl-, lauryl-, isodecyl- or stearylacrylamide and -methacrylamide (laurylmethacrylamide in particular proves to be especially advantageous);

vinyl or allyl alcohol esters of saturated carboxylic acids, such as vinyl or allyl acetate, propionate, versatate or stearate;

α,β-unsaturated nitriles containing from 3 to 12 carbon atoms, such as acrylonitrile or acrylonitrile, α-olefins and conjugated dienes;

mixtures and combinations of two or more of the above-mentioned monomers.

The Surfactants (S)

The surfactants (S) used in the context of the present invention can vary to quite a large extent, with the proviso that they are soluble, or at the very least dispersible, in water and preferably in the medium of step (E).

In particular, the surfactants (S) used according to the invention are soluble or dispersible in water in the sense that, once mixed in water at a concentration of 0.5% by weight and at 20° C. and left for one hour at this temperature:

they produce a transparent liquid or a stable emulsion without demixing (coalescence) or precipitation of solid;

the surface tension of the water is reduced to a value of $4.5\times10^{-2}$ N/m (45 dyne/cm) or less.

The surfactants (S) are generally of amphiphilic molecules having an affinity both for aqueous media and organic media, which can typically be neutral, anionic, cationic and/or amphoteric surfactants. Preferentially, neutral surfactants, typically bearing (i) hydrophobic blocks and (ii) ethoxylated and/or propoxylated blocks, are used.

Moreover, the surfactants (S) generally have a low molar mass, typically between 100 and 10000 g/mol, typically between 200 and 5000 g/mol.

According to one particular embodiment, the surfactants (S) are deactivatable surfactants, which lose their surfactant nature under certain physical and/or chemical conditions (temperature, pH, for example). In this case, the process of the invention advantageously comprises, following the polymer hydration step (E), a step (E2) of deactivating all or part of the surfactants (S), wherein the surfactants are placed under said conditions wherein they lose their surfactant nature.

According to a first variant of this embodiment, the surfactants (S) comprise (for example consist of) labile surfactants, which are degraded under conditions—typically temperature, pressure and/or pH conditions—wherein the polymers are not degraded, and, in step (E2), the surfactants are subjected to these conditions.

By way of example of a surfactant of this type, use may be made of surfactants of ethoxylated and/or propoxylated alkyl ester type, wherein the alkyl group comprises from 6 to 30 carbon atoms, in particular between 8 and 22, for instance ethoxylated $C_{10}$-$C_{20}$ alkyl esters, and in particular Alkamuls PSML20 available from the company Solvay.

According to another variant using deactivatable surfactants, the surfactants (S) comprise (for example consist of) surfactants such as those with a cloud point. The polymers of this type (described in particular in *Non ionic surfactants: Organic Chemistry*, Ed. Nico. M. VanOs, Surfactant Series, vol 72) have the property of losing their surfactant nature above a limit in temperature (cloud point). When surfactants of this type are used, step (E2) generally comprises submitting these surfactants to a temperature above their cloud point (this cloud point depends, in a manner well known per se, on the nature of the composition in which the polymers are placed, in particular the ionic strength of the medium).

By way of example of a surfactant with a cloud point of this type, surfactants of ethoxylated alkyl type with an alkyl group comprising from 6 to 30 carbon atoms, in particular between 8 and 22 and in particular a $C_{10}$-$C_{20}$ alkyl group, may be used, for instance Rhodasurf BC630 available from Solvay.

According to yet another embodiment, surfactants (S) which have a surfactant nature over a pH range only may be used. In this case step (E) is carried out while maintaining the surfactant in said pH range and, in step (E2), the pH is brought outside the range.

Other possible surfactants (S) are those described in *See Energy & Science*, Jessop et al. (2012), volume 5, p. 7240, the surfactant properties of which are inactivated in the presence of $CO_2$ ("$CO_2$ triggered switchable surfactants").

Whatever the nature of the surfactants (S), said surfactants are typically used in a proportion of 0.25% to 20%, typically of 0.5% to 10%, by weight relative to the weight of the polymer (P).

The Composition (C)

Typically, the solid composition (C) used in step (E) of the process of the invention is obtained according to the following steps, prior to step (E):

(E0) an aqueous composition comprising, in an intimate mixture, the polymers (P) in the hydrated state and the surfactants (S) is prepared; then (E1) the water (and where appropriate the other solvents) contained in the aqueous composition prepared in step (E0) is removed.

According to one particular variant, step (E0) can be carried out by synthesizing the polymers (P) in the presence of the surfactants (S).

More preferentially, step (E0) is carried out by mixing the surfactants (S) with the polymers (P) after the synthesis of the polymers (P), in particular by adding water or an aqueous mixture to which surfactants have been added, to the polymers, or else water or an aqueous mixture to a mixture of the polymers and of the surfactants. In this context, the polymer (P) is generally available in gel form at the end of its synthesis, and the intimate mixing thereof with the surfactants (S) can be carried out, inter alia, according to the two modes set out below:

According to a first mode, illustrated in examples hereinafter, step (E0) is carried out by dissolving the polymer (P) in an aqueous medium containing the surfactants, typically a water/water-soluble solvent/surfactant mixture, wherein the water-soluble solvent may for example be acetone.

According to this mode, the polymer is dissolved in the aqueous medium, thereby making it possible to ensure optimal interaction between the hydrophobic groups of the polymer (P) and the surfactants (S).

According to another mode, very suitable for industrial implementation, step (E0) can be carried out using less solvent (thereby reducing in particular the energy costs of step (E1)), by directly incorporating the surfactants into the polymer gel without performing any dissolution of the polymer in the water.

Typically, according to this variant, the surfactants are introduced into the polymer in gel form by subjecting this gel to agitation under mechanical stress, typically in a blender.

According to this variant, an intimate physical mixture of the polymers and surfactants is obtained without having to use solvent, the water present in the gel generally being sufficient to perform the role of dispersant medium. As a result, as required, the surfactant may be used without being dissolved in a solvent. According to one possible variant, water or a solvent may be added, preferably in reduced amounts, in order to facilitate the mixing, but such an addition is not generally necessary.

Step (E1) of eliminating the solvents can, for its part, be carried out in any way known per se.

When step E0 is carried out by dissolving the polymer, step (E1) is typically carried out by drying.

When step (E0) is carried out using the polymer in gel form, step (E1) can sin particular be carried out by stripping under vacuum the mixture resulting from step (E0), which can, for example, be carried out directly in the blender used in step (E0).

Step (E1) can advantageously comprise grinding at the end of the elimination of the solvents.

Whatever the exact embodiment of the composition (C), said composition is usually in the form of a divided solid, in particular in the form of a powder, of granules or of flakes.

Step (E): Hydration of the Composition (C)

A composition (C) according to the invention rehydrates very easily. In practice, step (E) can be carried out according to any standard procedure for dissolving water-soluble products.

In particular, the compositions (C) can be used in the same way as any other water-soluble product used in the oil sector, thereby constituting another advantage of these compositions, since they require no particular adaptation for processing thereof.

Various advantages and characteristics of the invention will emerge even more clearly from the illustrative example given hereafter:

EXAMPLE

Preparation of an Associative Polymer (P) Gel

An associative polymer (P) (poly Am/AMPS/LMAM) was prepared under the following conditions:

73.8 g of sodium dodecyl sulfate (SDS), 216.8 g of distilled water and 9.42 g of lauryl methacrylamide (LMAM) were introduced, at ambient temperature (20° C.) into a 500 ml PEHD flask. The mixture was stirred using a magnetic bar for 6 h, until a clear micellar solution was obtained.

168 g of the micellar solution thus prepared, 530.5 g of water, 592.1 g of acrylamide (aqueous solution at 50% by weight), 477.4 g of AMPS (aqueous solution at 51% by weight), 5.56 g of Rhodixan A1 (O-ethyl-S-(1-methoxycarbonyl)ethyl xanthate-ethanolic solution at 1.0% by weight) and 8.68 g of ammonium persulfate (aqueous solution at 5% by weight) were introduced, at ambient temperature (20° C.), into a Dewar flask (2000 ml) equipped with a lid which allows a sealed atmosphere.

The mixture was degassed by bubbling nitrogen for 40 minutes. 17.6 g of sodium sulfoxylate formaldehyde, in the form of an aqueous solution at 1% by weight, were added to the medium, in one step. The mixture was pre-degassed by bubbling nitrogen for 15 minutes.

The polymerization reaction was then allowed to take place with stirring for 16 hours, as a result of which the polymer (p) was obtained in the form of a gel.

Preparation of a Rehydratable Solid Composition (c) According to the Invention Comprising the Polymer (p) and a Surfactant (10% by Weight Relative to the Polymer)

25 g of previously prepared polymer gel were ground by means of a blender, then a solution of Rhodasurf BC630 surfactant in a water/acetone mixture (44 g of water, 46 g of acetone and 0.735 g of surfactant) were added to the ground material obtained. A homogeneous solution was then prepared by magnetically stirring the mixture for two hours.

The homogeneous solution obtained was dried on a tray, as a result of which a solid was obtained which was ground and sieved at 500 µm.

Hydration of the Solid Composition (C)

The hydration was monitored by means of an AR 2000 rheometer supplied by TA-Instruments, equipped with a geometry of concentric cylinder type, the spindle of which is replaced with a helicoidal geometry making it possible to ensure homogenization of the solution during the viscosity measurement.

The composition (c) was introduced into 50 g of sea water so as to form a solution containing 0.5% of active polymer (i.e. 0.25 g of polymer).

The hydration of the powder was monitored over time by measuring viscosity at a shear gradient of 100 s$^{-1}$ (i.e. a rotational speed of the helicoidal spindle of 150 rpm).

The results obtained are reported in the table hereinafter.

After two hours of hydration, visual observation of the solution makes it possible to be sure of the homogeneity of the solution obtained.

COMPARATIVE EXAMPLES

By way of comparison, the same monitoring was carried out, at equal amount of polymer (0.25 g of polymer) for hydrations of polymers carried out under conditions other than those of the invention:

Comparative Example 1: Without Addition of Surfactant the polymer (p) gel was ground under the same conditions as in the example according to the invention, dried on a tray, then sieved at 500 µm. The hydration of 0.25 g of polymer was carried out in 50 g of sea water.

Comparative Example 2: Addition of Surfactant to the Hydration Water the polymer (p) gel was ground under the same conditions as in the example according to the invention, dried on a tray, and then sieved at 500 µm. The hydration of 0.25 g of polymer was carried out in 50 g of sea water to which 0.025 g of surfactant had been added.

Comparative Example 3: Impregnation of Surfactant on the Polymer Powder the polymer (p) gel was ground under the same conditions as in the example according to the invention, dried on a tray, and then sieved at 500 µm. The powder obtained was "impregnated" with surfactant under strong stirring in order to ensure homogeneous distribution of the surfactant on the powder under the following conditions: 7.35 g of dried polymer without surfactant, sieved at 500 µm, were placed in a blender with stirring with 0.735 g of surfactant. The hydration of 0.275 g of powder was carried out in 50 g of sea water.

The viscosities obtained after characteristic hydration times, reported in the table below, clearly reveal that the conditions of the invention result in optimized hydration, carried out in a much shorter time than for the other examples.

| | Viscosity (mPa · s) after hydration for: | | | |
|---|---|---|---|---|
| | 10 minutes | 30 minutes | 1 hour | 2 hours |
| Comparative 1 | 6.8 | 7.4 | 7.3 | 8.5 |
| Comparative 2 | 7.3 | 51 | 148 | 271 |
| Comparative 3 | 11 | 78 | 192 | 332 |
| Invention | 167 | 650 | 811 | 930 |

Note:
For comparative example 1, solid residues remain after 12 hours (and the viscosity after 12 hours "of hydration" is only 20 mPa · s).

For comparative examples 2 and 3, non-hydrated residues also remain after two hours, whereas, in the case of the example according to the invention, no residues are observed: the hydration is total (perfectly homogeneous) after two hours.

The invention claimed is:

1. A process for hydration of associative polymers (P), resulting in the preparation of an aqueous composition comprising said associative polymers (P) in the form of a solution or of a gel, the process comprising a step (E) of adding water to a solid composition (C) comprising said associative polymers (P) and surfactants (S) suitable for improving the hydration of these polymers, the hydration being carried out in less than five hours, wherein said solid composition (C) is as obtained by drying an aqueous composition comprising a mixture of the associative polymers (P) in the form of a gel in the hydrated state and of the surfactants (S) obtained by post-addition of the surfactants (S) to associative polymers (P) resulting from a micellar polymerization wherein the associative polymers (P) are synthesized according to a controlled micellar radical polymerization step in which the following are brought into contact, in an aqueous medium (M):hydrophilic monomers, dissolved or dispersed in said aqueous medium (M); hydrophobic monomers in the form of a micellar solution; at least one radical polymerization initiator; and at least one radical polymerization control agent.

2. The process as claimed in claim 1, wherein the associative polymers (P) comprise a hydrophilic backbone and hydrophobic groups bonded to this backbone.

3. The process as claimed in claim 1, wherein the associative polymers (P) have a weight-average molar mass Mw of at least 500 000 g/mol.

4. The process as claimed in claim 1, wherein the surfactants (S) are deactivatable surfactants and wherein the process further comprises, following step (E), a step (E2) of deactivating all or part of the surfactants (S), wherein the surfactants are placed under physical and/or chemical conditions under which they lose their surfactant nature.

5. The process as claimed in claim 4, wherein the surfactants (S) comprise labile surfactants, which are degraded under conditions under which the polymers are not degraded, and wherein, in step (E2), the surfactants are subjected to these conditions.

6. The process as claimed in claim 4, wherein the surfactants comprise surfactants which have a cloud point, and wherein, in step (E2), the surfactants are subjected to a temperature above their cloud point.

7. The process as claimed in claim 1, wherein the solid composition (C) used in step (E) is obtained according to the following steps, prior to step (E):
(E0) an aqueous composition comprising, in an intimate mixture, the associative polymers (P) in the form of a gel in the hydrated state and the surfactants (S) is prepared; then
(E1) the water, and where appropriate the other solvents, contained in the aqueous composition prepared in step (E0) is removed.

8. The process as claimed in claim 7, wherein step (E0) is carried out by dissolving the associative polymer (P) in an aqueous medium containing the surfactants.

9. The process as claimed in claim 7, wherein step (E0) is carried out by directly incorporating the surfactants (S) into the associative polymers (P) in the form of a gel without performing any dissolution of the polymer in the water.

10. The process as claimed in claim 2, wherein the hydrophobic groups are concentrated in microblocks.

11. The process as claimed in claim 5, wherein the surfactants (S) are degraded under temperature, pressure and/or pH conditions under which the polymers are not degraded.

12. The process as claimed in claim 1, wherein the hydration is carried out in less than three hours.

13. The process as claimed in claim 12, wherein the hydration is carried out in less than one hour.

14. The process of claim 1, wherein the at least one radical polymerization control agent is a compound which comprises a thiocarbonylthio —S(C=S)— group.

* * * * *